UNITED STATES PATENT OFFICE.

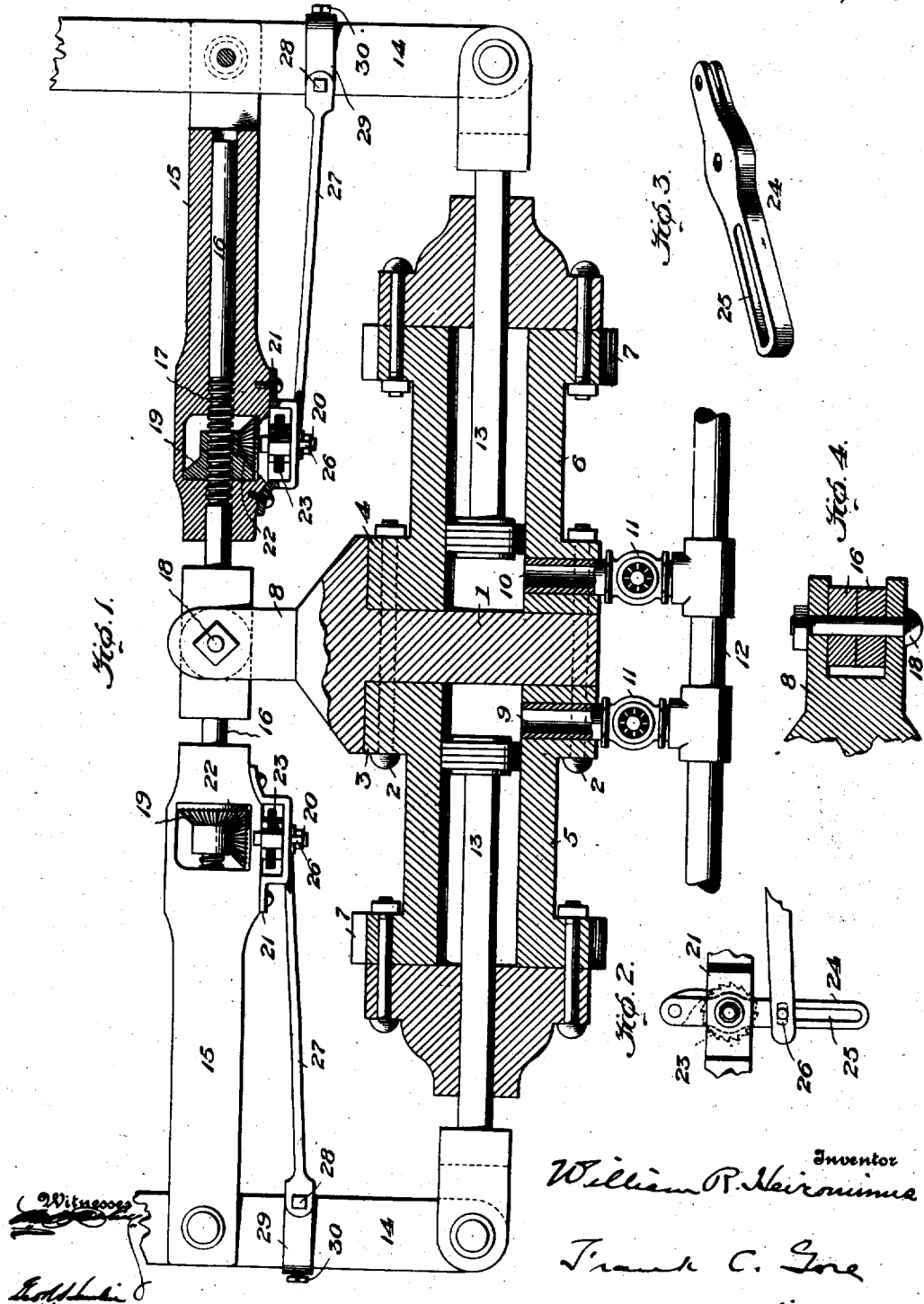

WILLIAM R. HEIRONIMUS, OF EVANSVILLE, INDIANA.

SLACK-ADJUSTER FOR AIR-BRAKES.

No. 903,378.

Specification of Letters Patent.

Patented Nov. 10, 1908.

Application filed March 12, 1908. Serial No. 420,757.

*To all whom it may concern:*

Be it known that I, WILLIAM R. HEIRONIMUS, a citizen of the United States, residing at Evansville, county of Vanderburg, and State of Indiana, have invented certain new and useful Improvements in Slack-Adjusters for Air-Brakes, of which the following is a specification.

My invention relates to slack adjusters for air brakes.

The present invention relates to that class of slack adjusters employing a ratchet wheel actuated screw adjustment rod and has for its object the provision of a novel structure of this general type; novel means for adjusting or regulating the action of the ratchet wheel, so that if the slack is not taken up fast enough, an easy adjustment may be had so that it will be more rapidly taken up; and to provide an improved duplex structure particularly adapted for use on electric cars where direct air pressure is used to work the brakes, whereby if one air brake rigging breaks or becomes damaged, it can be immediately cut out and the brakes still operated with the remaining rigging.

The most perfect embodiment of the invention which I have at this time devised is set forth fully hereinafter and the novel features recited in the appended claims, while in the accompanying drawings:—Figure 1 is a bottom plan view, largely in section, of the invention; Fig. 2, a detail of the pawl and ratchet lever device; Fig. 3, a detail of the pawl-carrying lever; and Fig. 4, a detail section showing the manner of connecting the extension rods to the head.

To a central casting of head 1 there are secured by bolts 2 the heads 3 and 4 of duplicate air cylinders 5 and 6 which have suitable brackets 7 for securement of the device to the bottom of the car. Projecting from the head 1 are lugs 8.

Connecting with the heads 3 and 4 are branch pipes 9 and 10 provided with cut-off valves 11 and connected to the main air pipe 12. If either air brake rigging becomes damaged, the proper valve 11 will be closed and the brakes operated on the remaining cylinder, thus permitting the car to be continued in use until opportunity for repairs can be had, but ordinarily both valves 11 will be open to permit both cylinders to be used.

In each cylinder is a piston having a rod 13 provided with the usual head to which the usual levers 14 for operating the brakes are pivoted.

The extension rods consist of socketed sections 15 pivoted to the levers 14, and rod-sections 16 which have screw-threaded parts 17 and telescope within the socketed sections 15, the sections 16 of both brake riggings being secured between the lugs 8 by a single bolt 18. Bevel gears 19, having internal screw-threads in engagement with the screw-threads 17, are disposed in openings in the section 15. Short shafts 20, journaled in the brackets 21 and in the sections 15, carry bevel gears 22 meshing with the bevel gears 19, and they also carry ratchet wheels 23. Loosely mounted on the shafts are ratchet levers 24 carrying suitable ratchets to engage the ratchet wheels, said levers having elongated slots 25 receiving pins 26 carried by take-up rods 27, which in turn, are connected by pins 28 to sleeves 29 having set screws 30 to secure them to the levers 14 which they embrace. The loose connection between the take-up rods 27 and the ratchet levers 24, and between said rods 27 and the sleeves 29, permits adjustment of the sleeves 29 and their securement at different desired points on the levers 14, so that if the slack is not taken up rapidly enough, this adjustment may be had to cause a more rapid taking up of the slack.

Ordinarily the valves 11 are both open and both cylinders are used to operate the brake, and the air pressure is thus equalized, but should one of the brake riggings become damaged or defective for any reason, it can be cut out by turning the valve 11 controlling its cylinder and the other cylinder and its mechanism still used to operate the brakes until repairs can be had. The pressure of the air forces out the piston 13, thereby causing the lever 14 to be rocked on the socketed extension rod 15 as a fulcrum to apply the brakes. As the brake shoes wear, greater movement of the lever 14 is necessary to properly apply them and, consequently, the rod 27 and the ratchet lever 24 cause rotation of the ratchet wheel and the bevel gears and, by the turning of the bevel gear 19, the socketed extension 15 is advanced or extended relatively to the extension rod 16, and thus the fulcrum of the lever 14 is advanced and the slack is thus taken up, this operation taking place automatically whenever the requirements of use demand it.

If it is found that the take-up mechanism does not operate fast enough in practice, the sleeve 29 is shifted nearer to the rod 13 and re-clamped on lever 14, and the greater leverage obtained causes greater play of the rod 27 and, consequently, a greater amount of rotation of the bevel gear 19 and more extended feed of the socketed extension 15. The connection of the rod 16 of both mechanisms to the same bolt and part of the head 1 causes the pressure to be balanced and equalized and thus relieves the mechanism of much strain which would otherwise exist.

Having thus described my invention, what I claim as new and desire to secure by Letters Patent, is:—

1. In a slack adjuster for air brakes, the combination with a cylinder and a piston and piston rod, of a brake operating lever, an adjustable fulcrum rod composed of a section to which the brake operating lever is pivoted, and a screw-threaded section, a gear coöperating with the screw-threaded section to extend or lengthen the said fulcrum rod, and means for rotating the gear from the brake operating lever.

2. In a slack adjuster for air brakes, the combination with a cylinder and a piston and piston rod, of a brake operating lever, an adjustable fulcrum rod composed of a section to which the brake operating lever is pivoted, and a screw-threaded section, a gear coöperating with the screw-threaded section to extend or lengthen the said fulcrum rod, a rotary pawl and ratchet mechanism for turning the gear, and means for operating said pawl and ratchet mechanism from the brake operating lever.

3. In a slack adjuster for air brakes, the combination with a cylinder and a piston and piston rod, of an adjustable fulcrum rod, a brake operating lever pivoted thereto and connected to the piston, and means adapted to be connected to the lever at different points of the length thereof which is adapted for adjusting the fulcrum rod.

4. In a slack adjuster for air brakes, the combination with a cylinder and a piston and piston rod, of an adjustable fulcrum rod, a brake operating lever pivoted thereto and connected to the piston, and means for adjusting the fulcrum rod comprising rotary pawl and ratchet mechanism, and a rod connecting said pawl and ratchet mechanism to the lever.

5. In a slack adjuster for air brakes, the combination with a cylinder and a piston and piston rod, of an adjustable fulcrum rod, a brake operating lever pivoted thereto and connected to the piston, and means for adjusting said fulcrum rod comprising pawl and ratchet mechanism, an adjustable sleeve carried by the lever, and a rod connecting the sleeve to the pawl and ratchet mechanism.

6. In a slack adjuster for air brakes, the combination with a cylinder and a piston and piston rod, of an adjustable fulcrum rod, a brake operating lever pivoted thereto and connected to the piston, and a rod adjustably connected to the lever so that it may be operatively secured at different points thereof which is adapted for adjusting the fulcrum rod.

In testimony whereof, I hereunto affix my signature in presence of two witnesses.

WILLIAM R. HEIRONIMUS.

Witnesses:
F. C. GORE,
P. C. HOPKINS.